(12) United States Patent
Blott et al.

(10) Patent No.: US 11,825,240 B2
(45) Date of Patent: Nov. 21, 2023

(54) VIDEO BASED MONITORING SYSTEM USING MULTIPLE CAMERAS, METHOD, COMPUTER PROGRAM AND STORAGE MEDIUM

(71) Applicant: Robert Bosch GmbH, Stuttgart (DE)

(72) Inventors: Gregor Blott, Salzgitter (DE); Jan Rexilius, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 17/203,330

(22) Filed: Mar. 16, 2021

(65) Prior Publication Data
US 2021/0297630 A1    Sep. 23, 2021

(30) Foreign Application Priority Data
Mar. 18, 2020  (DE) ..................... 10 2020 203 461.3

(51) Int. Cl.
*H04N 7/18*    (2006.01)
*G06N 3/08*    (2023.01)
(Continued)

(52) U.S. Cl.
CPC ........... *H04N 7/181* (2013.01); *G06F 18/256* (2023.01); *G06N 3/08* (2013.01); *G06V 10/811* (2022.01);
(Continued)

(58) Field of Classification Search
CPC .. H04N 7/181; H04N 23/661; H04N 5/23206; H04N 23/61; H04N 23/611;
(Continued)

(56) References Cited

U.S. PATENT DOCUMENTS

| 6,654,047 B2 * | 11/2003 | Iizaka | G06Q 30/02 |
| | | | 348/E7.086 |
| 10,671,856 B1 * | 6/2020 | Ren | G06F 18/22 |

(Continued)

FOREIGN PATENT DOCUMENTS

DE    102008001126 A1    10/2009

*Primary Examiner* — Timothy J Henn
*Assistant Examiner* — Akshay Trehan
(74) *Attorney, Agent, or Firm* — Michael Best & Friedrich LLP

(57) ABSTRACT

A monitoring system 1 is proposed, having a camera network 3 for the video-based monitoring of a monitoring region 2, wherein the camera network 3 comprises a plurality of cameras 3a, b for recording a partial monitoring region 2a, b of the monitoring region 2 in each case, wherein the plurality of cameras 2a, b are configured to provide monitoring images 6a, b of the partial monitoring regions 2a, b, having at least one sensor device 7a, b for detecting at least one person-related object information item, having a monitoring device 5 for recognizing persons 4 in the monitoring images 6a, b, wherein the monitoring device 5 comprises a person detection module 10, the person detection module 10 being configured to detect persons 4 in the monitoring images 6a, b, wherein the monitoring device 5 comprises an assignment module 11, the assignment module 11 being configured to assign an item of person-related object information from a partial monitoring region 7a, b to a person 4 in the same partial monitoring region 7a, b and to provide it as personal data, wherein the monitoring device 5 comprises a comparison module 12, the comparison module 12 being configured to compare personal data from a plurality of different partial monitoring regions 7a, b, wherein if a match is found in the personal data from at least two partial monitoring regions 7a, b, a person 4 is recognized in the monitoring images 6a, b.

15 Claims, 2 Drawing Sheets

(51) Int. Cl.
*G06V 20/10* (2022.01)
*G06V 40/10* (2022.01)
*H04N 23/661* (2023.01)
*G06V 10/80* (2022.01)
*G06V 20/52* (2022.01)
*G06F 18/25* (2023.01)
*G08B 13/196* (2006.01)

(52) U.S. Cl.
CPC .............. *G06V 20/10* (2022.01); *G06V 20/52* (2022.01); *G06V 40/10* (2022.01); *G06V 40/103* (2022.01); *G08B 13/19645* (2013.01); *H04N 23/661* (2023.01); *G08B 13/19608* (2013.01)

(58) Field of Classification Search
CPC ...... G06N 3/08; G06F 18/256; G06V 10/811; G06V 20/10; G06V 20/52; G06V 40/10; G06V 40/103; G08B 13/19645; G08B 13/19608

See application file for complete search history.

(56) References Cited

U.S. PATENT DOCUMENTS

| | | | | |
|---|---|---|---|---|
| 10,747,991 | B2* | 8/2020 | Nishikawa | G06T 1/0007 |
| 2003/0164878 | A1* | 9/2003 | Iizaka | H04N 7/181 |
| | | | | 348/E7.086 |
| 2009/0259571 | A1* | 10/2009 | Ebling | G06Q 50/30 |
| | | | | 705/28 |
| 2010/0114802 | A1* | 5/2010 | Bobbitt | G06N 20/00 |
| | | | | 706/54 |
| 2016/0260106 | A1* | 9/2016 | Tonoike | G06V 40/173 |
| 2016/0283797 | A1* | 9/2016 | Chung | G06F 18/41 |
| 2019/0019019 | A1* | 1/2019 | Nishikawa | G06T 1/0007 |
| 2019/0080277 | A1* | 3/2019 | Trivelpiece | G06Q 20/3224 |
| 2020/0014885 | A1* | 1/2020 | Carey | H04W 4/029 |
| 2020/0311401 | A1* | 10/2020 | Nonaka | G08B 13/19608 |

* cited by examiner

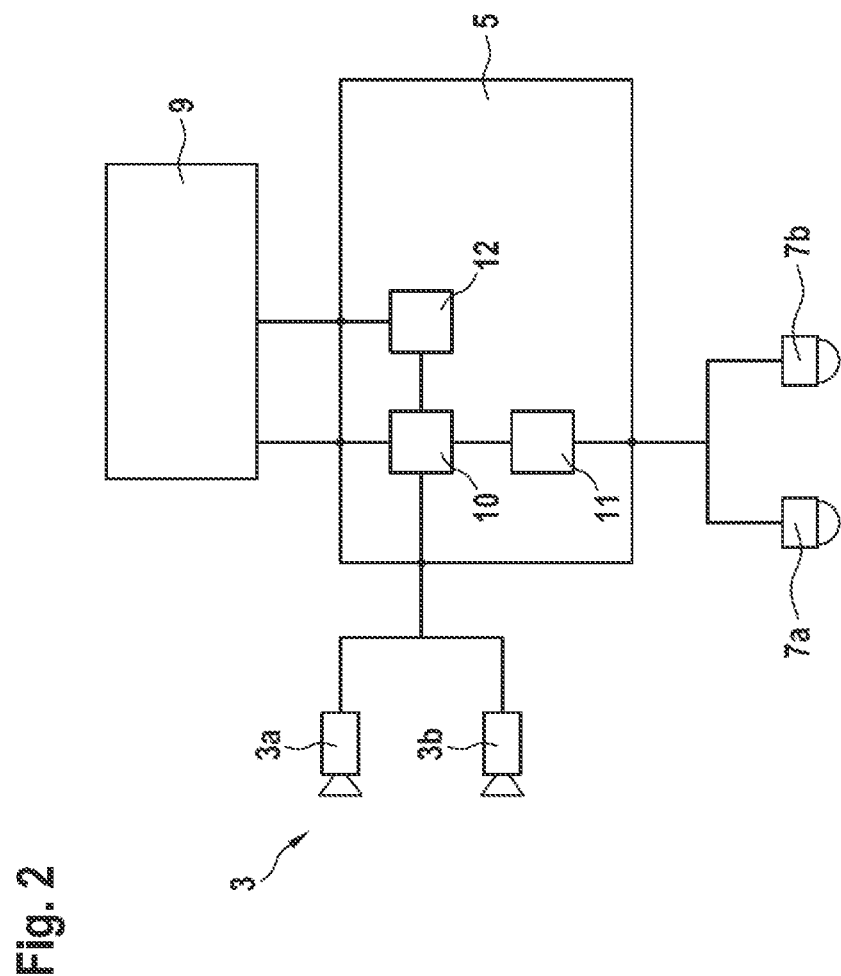

VIDEO BASED MONITORING SYSTEM USING MULTIPLE CAMERAS, METHOD, COMPUTER PROGRAM AND STORAGE MEDIUM

BACKGROUND OF THE INVENTION

The invention relates to a monitoring system. Furthermore, the invention relates to a method, a computer program, and a storage medium.

Video-based monitoring and service offerings are an important aspect in many retail applications, such as footfall analysis, theft prevention, vandalism, etc. Often, the tracking of individuals throughout the camera network is also used, in which one person must be recognized in different cameras. The identification of individual people can often be difficult, because common methods for recognizing people can often be error-prone or a person can appear differently in different cameras.

The document DE 102008001126 A1 discloses an inventory module for a video monitoring system, the video monitoring system comprising at least one monitoring camera which is and/or can be directed at a monitoring region with products, in particular a warehouse area and/or sales area, having a detection device which is designed to detect the products, wherein the detection involves ascertaining position information and identification information of the detected product, and an assignment device which is designed to model a spatial distribution of the products in the monitoring region via the position information and the identification information from a plurality of detected products. Furthermore, the inventory module comprises an object detection device for detecting moving objects, in particular buyers, as well as a correlation device, which is designed to correlate the movement behavior of the moving objects with the arrangement of the products.

SUMMARY OF THE INVENTION

The object of the invention is a monitoring system. The monitoring system comprises a camera network which is designed and/or suitable for video-based monitoring of the monitoring region. The monitoring system can be distributed over several sections of the monitoring region and/or other regions, for example of a central security monitoring system. The monitoring region can comprise an indoor and/or outdoor region. For example, the monitoring region is a public area, such as a department store, a train station, an airport, or the like.

The camera network comprises a plurality of cameras, which are designed and/or suitable for capturing a partial monitoring region of the monitoring region. The cameras can be designed as color, black-and-white and/or infrared cameras. Preferably, the cameras are arranged in the monitoring region. The partial monitoring regions monitored by different cameras can overlap each other. Alternatively, the partial monitoring regions of different cameras are designed without overlaps. The cameras are designed to provide monitoring images of the partial monitoring regions, in particular as video data.

The monitoring system comprises a sensor device which is designed and/or suitable for detecting at least or exactly one person-related object information item. In particular, the sensor device is designed to capture the person-related object information optically and/or electrically and/or magnetically. For example, the sensor device can be a component of a point-of-sale (POS) system, e.g. a scanner and/or card reader, or a wireless network, e.g. a WLAN or Bluetooth. In particular, the person-related object information is based on an object or object state that can preferably be assigned to a person to be recognized. For example, the objects can be one or more objects that are located within a radius, such as a fixed radius from the person to be recognized, and/or that are manually assigned to the person to be recognized. For example, the object states can be one or more states and/or state changes of objects that the person carries with them and/or that can be detected by the sensor device. In particular, the sensor device is designed to detect the at least one object information item for specifiable, predefined and/or for all objects and/or object states.

The monitoring system comprises a monitoring device which is designed and/or suitable for recognizing persons in the monitoring images. The person recognition can be used to recognize a specifiable person to be sought, and/or a plurality of persons in different monitoring images. The persons to be recognized may be individuals, groups of persons, or alternatively even animals and/or objects. In particular, the monitoring device is provided with a plurality of monitoring images from different cameras. For example, the cameras and the monitoring device each have an interface, wherein the interfaces can be coupled for data transmission.

The monitoring device comprises a person detection module which is designed and/or suitable for detecting persons in the monitoring images. For example, the monitoring device is designed as a computer device, wherein the person detection module can be designed as a hardware module or software module of the monitoring device. In particular, the person detection module is designed to analyze and/or process the monitoring images. At least one or exactly one person may be present or present in the monitoring images, in particular temporarily or permanently. The person detection module is designed to detect a person, some and/or all of the persons in the monitoring images on the basis of the monitoring images. The person detection module is designed, in particular, to examine the monitoring images based on rules, for example on predefined parameters and/or characteristics, with the parameters being designed to identify persons and/or distinguish between persons and the background.

The monitoring device comprises an assignment module which is designed and/or suitable for assigning at least or exactly one person-related object information item from a partial monitoring region to a person in the same partial monitoring region. For example, the assignment module can be designed as a hardware or software module of the monitoring device. In particular, the assignment module is designed to assign the person-related object information to exactly one person in the monitoring images. Preferably, the person-related object information is and/or can be assigned uniquely and/or permanently to the exactly one person. The assignment module is designed to provide the monitoring images containing the identified person to whom at least one person-related object information item is assigned, as personal data.

As part of the invention, it is proposed that the monitoring device comprises a comparison module. The comparison module is designed to compare personal data from more than one, in particular at least two, different partial monitoring regions. For example, the comparison module can be designed as a hardware or software module of the monitoring device. In particular, the person detection module and/or the assignment module and/or the comparison module can form a common module. The comparison module is designed to recognize a person in the monitoring images if the personal data from at least two partial monitoring regions match. To this end, the comparison module accesses the personal data provided by the assignment module in order to compare the persons detected in the plurality of partial monitoring regions with each other, taking into account the personal data. If there is a match or a minimum level of correspondence, the person can be construed as having been recognized.

The object information is thus used to recognize the person, so that it is not only the features of the actual person that are used in the recognition and/or for the recognition of the person, but objects or object states uniquely identified by the sensor device are also used. Instead of merely searching for the target person in the pictures, for example, a match of the personal data can be used as a clue and/or indication of the person to be recognized. The invention is therefore based on the idea of enabling improved recognition of persons in a monitoring region. This can be used to improve the recognition of people from monitoring images from different cameras.

In a specific design, it is provided that the assignment module is designed to determine and/or select the object information for the person based on a set of rules and/or by means of an artificial intelligence system. For example, the assignment module may be designed to evaluate past video data and/or video data that is currently and/or still being recorded, and to determine which object information belongs to the person being recognized based on the rules and/or the artificial intelligence system. Examples of such a selection and/or rules may include the fact that the person to be recognized has been in the vicinity of the object for some time and/or is performing an action on the object and/or is moving with the object. In particular, an assignment can be made if the object information is captured by the sensor device and if the person is detected by the person detection module at the same time and/or in the same image region in the same partial monitoring region.

In a further design it is provided that the sensor device is designed to capture the object information automatically and/or in a contactless manner. In particular, the sensor device is used for the automatic identification of the object information, also known as "Auto-ID". Preferably, the object information comprises an identifier that is used to uniquely identify the object, or object state. For example, the identifier can be a code assigned to the object or object state.

In a first concrete implementation, it is provided that the object information is based on a product. The product can be designed as a consumable item or as a commodity. Preferably, the product is arranged in the monitoring region as normal. For this purpose, the product can be positioned as normal in storage arrangements, such as shelves or the like. For example, the product may be a commercial product, such as food, tobacco or alcohol, drug items, etc. Alternatively, the product can also be a stock product, such as a tool, consumable materials, medicines, etc. Alternatively, the product can also be a returnable item, such as bottles, packaging, etc. The sensor device is comprised of a registration system that is designed and/or suitable for registering the product. The monitoring region is preferably implemented as a warehouse area and/or sales area, in particular a sales counter, such as in a supermarket. In particular, the registration system comprises one or more POS terminals which are arranged in the monitoring region. In particular, the object information can be displayed on the object in a 2D code, e.g. a barcode or QR code. The sensor device can be designed, for example, as either a mobile data acquisition device or one that is integrated in the cash terminal for capturing the 2D code.

In an alternative specific implementation, it is provided that the object information is based on a personal article belonging to the person. The article can be in the form of a mobile terminal, a bank card, radio key or the like. In particular, the article is designed to transmit the object information to the sensor device by a data link, in particular wirelessly. For this purpose, the article is designed as a transmitter and the sensor device as a receiver. Preferably, the article can be connected to the sensor device via a radio link. For example, the article may comprise a transponder, e.g. an RFID chip, wherein the sensor device is designed as a reader for reading out the transponder. Alternatively, the article and the sensor device can be integrated into the radio network and/or communicate with each other via the radio network.

In a further embodiment of the invention, it is provided that the person detection module is designed to capture at least one or exactly one personal information item of the identified persons. In particular, the monitoring device is designed to detect and/or recognize the person on the basis of the personal information. In particular, the personal information comprises a person-related feature or a feature associate with the person, in particular at least or exactly one abstract personal characteristic of the identified person. Preferably, the processing module is designed to extract the personal information items of the identified person from the monitoring images. The assignment module is designed to provide the personal information to the comparison module as additional personal data. In particular, the personal information can be analyzed and/or used by the comparison module in addition to the object information. The object information is preferably given a higher priority than the personal information, wherein if there is a match in the personal information but a discrepancy in the object information, the person is not recognized or only partially recognized.

In a further specific implementation, the personal information comprises an appearance feature and/or a clothing feature and/or a movement feature of the person. In particular, the at least one appearance feature describes the person's gender, hair color, skin color, facial features, height, build, etc. In particular, the at least one clothing feature describes a clothing color, type of garment etc. of the person. In particular, the movement feature describes a gait, speed of movement, direction of movement, etc. of the person.

A further design provides that the monitoring system has at least one or exactly one additional sensor device. In particular, the additional sensor device has the function of capturing the person-related object information in a further partial monitoring region, so that the object information can be captured in at least two different and/or separate partial monitoring regions. For this purpose, one sensor device is preferably located in a first partial monitoring region and the other sensor device in a second partial monitoring region. In particular, the assignment module is designed to assign the person-related object information captured by the sensor devices uniquely to a person. It is preferably provided that the person recognition device is used to track a person in the monitoring region and/or in one or more partial monitoring regions. The person being tracked can be recognized as exactly the same person if the associated object information items captured in the first and second partial monitoring region match and/or are identical.

The monitoring system preferably comprises a training system that is designed and/or suitable for training the monitoring device with reliable training data. In particular, the training system is designed to train the monitoring device by means of a deep-learning method. The training system can be designed as a software module and/or hardware module. Preferably, the training system is and/or can be connected to the monitoring device by a data link. In particular, this enables images to be transferred from the monitoring device to the training system as the training data. This makes it possible to train the training system with real images.

It is preferable that the images are in the form of monitoring images of different partial monitoring regions. In particular, the training data are formed by such monitoring images in which a person included in the monitoring images is recognized based on the matching personal data. In particular, all monitoring images in which a person is uniquely recognized based on the matching personal data are used as the training data. This has the advantage that the monitoring device can be trained to a very high detection rate and precision in the recognition of persons.

A further object of the invention is formed by a method for recognizing persons in monitoring images. In the method it is provided that persons are recognized in the monitoring images. For example, the monitoring images are recorded by a camera network having a plurality of cameras, preferably at least or exactly two cameras. In a further step, person-related object information is captured in a monitoring region. In particular, the person-related object information is captured in at least or exactly two different partial monitoring regions of the monitoring region. In a further step, at least one or exactly one person-related object information item from a partial monitoring region is assigned to a person in the same partial monitoring region and provided as personal data. In particular, the person-related object information is determined or selected for the person based on a set of rules and/or by means of artificial intelligence. The personal data obtained from multiple different partial monitoring regions is then compared, wherein if the personal data items from at least two different partial monitoring regions match, one person is recognized in some or all monitoring images. In particular, a person detected in the monitoring images is recognized if the associated personal data from at least one first partial monitoring region matches the associated personal data from a second partial monitoring region.

Preferably, the method is designed to track the persons based on the monitoring images in the monitoring region, in particular in the partial monitoring regions. In particular, the persons in the monitoring images are automatically detected and tracked over time. Preferably, the person being tracked is recognized in the monitoring images if the personal data items from the at least two different partial monitoring regions match. Optionally, one or more personal information item, e.g. specific personal features of the detected person, can be extracted from the monitoring images, wherein the personal information is invoked during the person recognition in order to identify and/or recognize the person in the monitoring images. Thus, a person can be uniquely and seamlessly tracked and identified across the entire camera network.

In another implementation, it is provided that the method is designed to generate and/or store the monitoring images with the matching personal data as training data for training an image processing algorithm. For example, the method is used to convert a plurality of monitoring images into a plurality of training data items. In particular, for this purpose the monitoring images with the matching personal data are generated and/or saved as training data for training the image processing algorithm. For example, the training data generated can be provided to a machine learning algorithm for an image analysis software and/or an image algorithm.

A further object of the invention is formed by a computer program, wherein the computer program is designed to carry out the method for recognizing persons when the computer program is executed on a computer, a processor unit or the monitoring device.

Another object of the invention is a storage medium, wherein the storage medium comprises the computer program as described earlier.

BRIEF DESCRIPTION OF THE DRAWINGS

Further advantages, effects and embodiments are obtained from the attached figures and their description. In the drawings:

FIG. 2 shows the monitoring system from FIG. 1 in a schematic block diagram.

DETAILED DESCRIPTION

Figure 1:
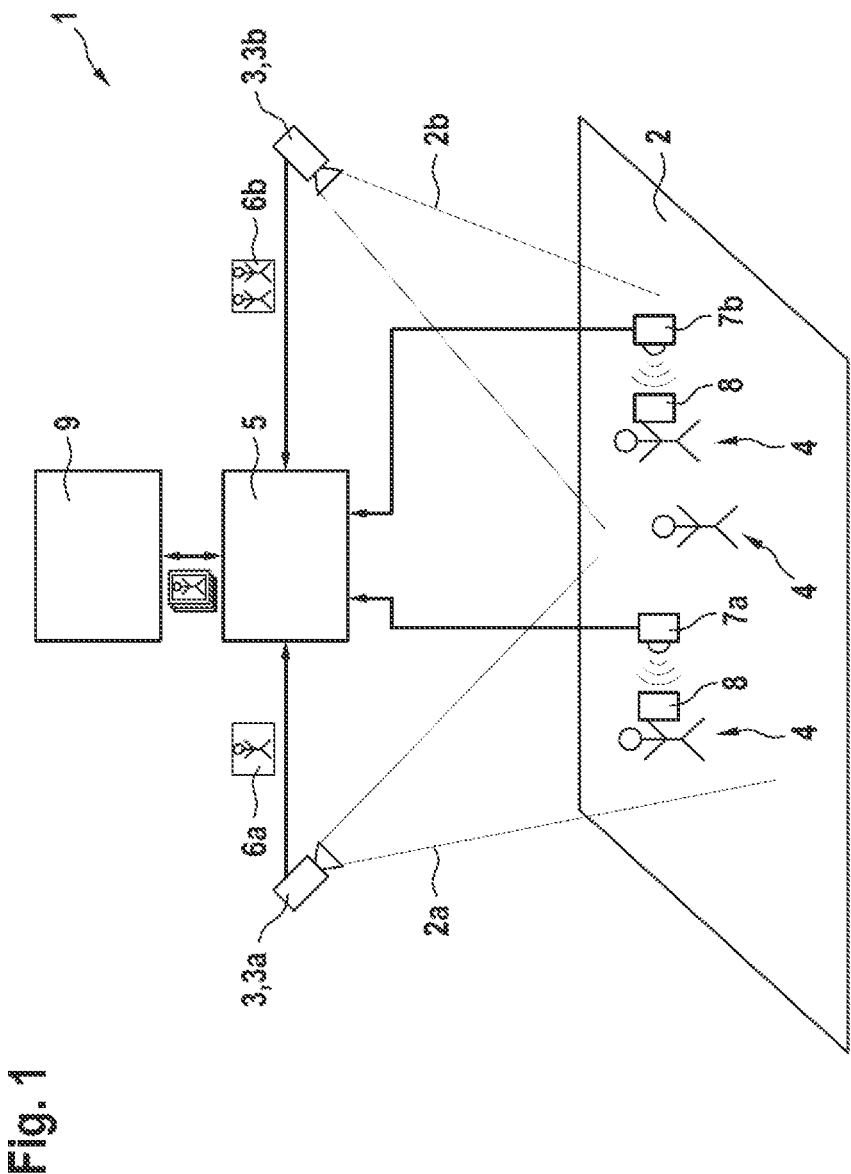
FIG. 1 shows a schematic representation of a monitoring system having a monitoring device as an exemplary embodiment of the invention.

FIG. 1 shows a highly schematized drawing of a monitoring system 1, which is used to monitor a monitoring region 2. The monitoring system 1 comprises a camera network 3, which is designed to monitor the monitoring region 2 using video technology. For this purpose, the camera network 3 comprises a plurality of cameras 3a, b, which are implemented as video cameras, for example, preferably as color cameras. For example, the monitoring region 2 is formed by a sales area, wherein the cameras 3a, b can be installed at different positions to monitor different partial monitoring regions 2a, b of the monitoring region 2.

A number of persons 4 are located in the monitoring region 2 and can move around freely there. The persons 4 are also monitored using video technology by means of the cameras 3a, b. The cameras 3a, b image the respective partial monitoring region 2a, b in the form of monitoring images 6a, b, and the cameras 3a, b provide the monitoring images 6a, b as video sequences.

The monitoring system 1 comprises a monitoring device 5, which is designed to analyze and/or process the monitoring images 6a, b of the cameras 3a, b. For this purpose, the cameras 3a, b can be connected to the monitoring device 5 wirelessly or via cables. The monitoring images 6a, b recorded by the cameras 3a, b are thus transferred to the monitoring device 5 and processed there.

Furthermore, the monitoring system 1 comprises a first and a second sensor device 7a, b, which are used to capture person-related object information. In particular, person-related object information is to be understood as information that can be uniquely assigned to an object 8 which has a connection to the person 4. Preferably, the object 8 is arranged in a defined area around the person 4 permanently and/or for most of the time. The object information can be transferred to the monitoring device 5 and processed there. For this purpose, the sensor devices 6a, b can be connected to the monitoring device 5 wirelessly or via cables. The first sensor device 7a is designed for capturing object information in the first partial monitoring region 2a and the second sensor device 7b for capturing object information in the second partial monitoring region 2b.

The monitoring device 5 is designed to recognize persons 4 in the monitoring images 6a, b of the plurality of cameras 3a, b. In particular, the monitoring device 5 is designed to recognize persons 4 in the monitoring images 6a, b based on an algorithm from the field of machine learning, also known as deep learning. For this purpose, the monitoring system 1 comprises a training device 9, which is designed to train the monitoring device 5, in particular the algorithm, wherein the training requires both the monitoring images 6a, b and an assignment of the same persons 4 in the recordings of the different cameras 3a, b.

The further processing of the monitoring images 6a, b and the object information is explained using FIG. 2, which shows a schematic block diagram of the monitoring system 1 as an exemplary embodiment of the invention. Starting from the cameras 3a, b, the monitoring images 6a, b are directed to the monitoring device 5, where they are transferred to a person detection module 10. The person detection module 10 is designed, among other things, to check the monitoring images 6a, b for persons 4 and to recognize any persons 4 that are found as such. For example, the detection module 11 can analyze the monitoring images 6a, b for specific characteristics and, based on a set of rules, assess whether something is a person 4 or an object.

The monitoring device 5 comprises an assignment module 11, which is connected to the sensor devices 7a, b and the person detection module 10 by a data link. Starting from the sensor devices 7a, b, the person-related object information is directed to the monitoring device 5, where it is transferred to the assignment module 11. In addition, the monitoring images 6a, b with the detected persons 4 are transferred from the person detection module 10 to the assignment module 11. The assignment module 11 is designed to assign the person-related object information to a person 4 detected in the monitoring images 6a, b. For example, the assignment module 11 can assign the object information to the person 4 based on a set of rules and/or by means of artificial intelligence.

The assigned object information is then made available together with the monitoring images to a comparison module 12 as personal data. In addition, the person detection module 10 can be designed to extract one or more personal information items of the persons 4 and to provide them to the comparison module 12 as additional personal data. The comparison module 12 is designed to compare the personal data obtained from the monitoring images 6a, b of the first and second partial monitoring regions 2a, b with each other, wherein if the personal data items match, a person 4 in different monitoring images 6a, b is recognized as the same person.

A method for improving the correct assignment of persons 4 from the monitoring images 6a, b of different cameras 3a, b is therefore proposed. For this purpose, for example, the specific circumstances found in retail stores, such as supermarkets, can be taken into account. For this purpose, for example, the sensor devices 7a, b are implemented as sensors which are already present in the monitoring region 2. These sensors are, for example, readers for EC cards in the POS field, WLAN and Bluetooth access points or near-field transmissions, such as "Keyless Go" for opening vehicles, wherein the objects 8 are accordingly of a type which can be detected by the sensors automatically and/or contactlessly. This means that no additional installation costs are incurred.

In a possible exemplary embodiment, the first sensor device 7a can be formed or comprised by, for example, a reverse vending machine, wherein the object 8 is in the form of a deposit receipt. If a person 4 returns a returnable item, the person 4 receives the deposit receipt, wherein the first sensor device 7a detects the object information associated with the deposit receipt, e.g. a barcode. At the same time, the person 4 is captured by a first camera 3a in the first partial monitoring region 2a and detected by the person detection module 10 in the monitoring images 6a of the first camera 3a. The assignment module 11 assigns the detected object information to the detected person 4 and makes this available to the comparison module 12 as personal data.

The monitoring device 5 then attempts to track the detected person 4 across the set of cameras up to the second sensor device 7b. For example, the monitoring device 5, in particular the person detection module 10, can be designed to track the person 4 across some, all, or at least the two cameras 3a, b. For example, the second sensor device 7b can be designed as a POS system or be comprised by one. The handover of the deposit receipt at the checkout is detected by the second sensor device 7b as person-related object information. At the same time, the person 4 is captured by the second camera 3a in the first partial monitoring region 2a and detected by the person detection module 10 in the monitoring images 6b of the second camera 3b. The assignment module 11 assigns the detected object information detected by the second sensor device 7b to the detected person 4 and makes this available to the comparison module 12 as personal data.

The comparison module 12 then compares the personal data obtained from the two partial monitoring regions 2a, b. If the personal data match, the person 4 in the monitoring image 6a is recognized as the same person 4 as in the monitoring image 6b. Thus, all monitoring images 6a, b in which the person 4 was detected and tracked can be re-used. If the personal data do not match, it is likely that the persons 4 in the individual monitoring images 6a, b, have been confused, with the result that these monitoring images 6a, b are discarded.

Optionally, it is also possible to use products arranged in the monitoring region 2, such as foodstuffs, care products, etc., as additional objects. In this case additional object information can be captured by the second sensor device 7b, e.g. when scanning the products using the POS system, and made available to the assignment module 11 as additional personal data. In addition to personal information, such as height, clothing, hair color, skin color, etc., the person detection module 10 can also extract position information of the person 4 in the monitoring region 2 from the monitoring images 6a, b. If the additional object information of a particular product, such as cheese, is detected by the second sensor device 7b at the checkout, then only those persons 4 who also have the same position information as the product, e.g. the cheese counter, are considered for recognition. In particular, the comparison module 12 is designed to also compare the personal information and/or position information as well as the object information. This can significantly reduce the incorrect assignment of the persons 4. In addition, cost savings can be achieved by simplifying the assignment of persons 4 in the monitoring images 6a, b from different cameras 3a, b.

In order to improve the person recognition of the monitoring device 5, the monitoring device 5, in particular the person detection module 10, specifically the algorithm, must be trained by the training device 9 using reliable training data. For this purpose, vast amounts of data are usually required in order, for example, to train a person detector and the correct features for the recognition.

It is therefore proposed that the monitoring images 6a, b used for training the monitoring device 5 be processed beforehand using a filter, wherein only the monitoring images 6a, b in which a person 4 was reliably recognized will be used as training data. For this purpose, the persons 4 must be reliably recognized in the monitoring images 6a, b of the cameras 3a, b so that the monitoring device 5 can be improved iteratively. For this purpose, only the monitoring images 6a, b, in which a match in the personal data was determined by the comparison module 12 are used as training data. This makes the result more robust and false examples are not used by the training device 9 for training.

The invention claimed is:

1. A monitoring system (1) comprising:
   a camera network (3) for video-based monitoring of a monitoring region (2), wherein the camera network (3) includes a plurality of cameras (3a, b) for recording a partial monitoring region (2a, b) of the monitoring region (2) in each case, the plurality of cameras (2a, b) configured to provide monitoring images (6a, b) of the partial monitoring regions (2a, b),
   at least one sensor device (7a, b) including a first electronic processor configured to detect at least one item of person-related object information,
   a monitoring device (5) including memory and a second electronic processor configured to recognize persons (4) in the monitoring images (6a, b), wherein the monitoring device (5) includes a person detection module (10) stored in the memory, the person detection module (10) being designed to detect persons (4) in the monitoring images (6a, b), wherein the monitoring device (5) has an assignment module (11) stored in the memory, the assignment module (11) being designed to assign an item of person-related object information from a partial monitoring region (2a, b) to a person (4) in the same partial monitoring region (2a, b) and to provide it as personal data, wherein the personal data also includes a feature of the person (4) detected in the monitoring images (6a, b),
   wherein the monitoring device (5) includes a comparison module (12) stored in the memory, the comparison module (12) configured to compare personal data from a plurality of different partial monitoring regions (2a, b), wherein if a match is found in the personal data from at least two partial monitoring regions (2a, b) a person (4) is recognized in the monitoring images (6a, b), wherein the monitoring device (5) prioritizes matches of the person-related object information over matches of the feature of the person (4).

2. The monitoring system (1) according to claim 1, wherein the assignment module (11) is configured to determine the object information for the person (4) based on a set of rules and/or by means of an artificial intelligence system.

3. The monitoring system (1) according to claim 1, wherein the sensor device (7a) is configured to capture the object information automatically and/or in a contactless manner.

4. The monitoring system (1) according to claim 1, wherein the object information is based on a product, wherein a registration system for registering the product comprises the sensor device (7a, b).

5. The monitoring system (1) according to claim 1, wherein the object information or additional object information is based on a personal article belonging to the person (4), the article being configured as a transmitter and the sensor device being configured (7a, b) as a receiver.

6. The monitoring system (1) according to claim 1, wherein the person detection module (10) is configured to extract at least one personal information item of a person (4) from the monitoring images (6a, b), wherein the person detection module (10) is configured to provide the personal information and/or the position information to the comparison module (12) as additional personal data.

7. The monitoring system (1) according to claim 6, wherein the personal information comprises an appearance feature and/or a clothing feature and/or a movement feature of the person.

8. The monitoring system (1) according to claim 1, further comprising at least one additional sensor device (7a, b), wherein the at least one additional sensor device (7a) is configured to capture person-related object information in a first partial monitoring region (2a) and the other sensor device (7b) is configured to capture person-related object information in a second partial monitoring region (2b).

9. The monitoring system (1) according to claim 1, further comprising a training device (9), wherein the training device (9) includes a third electronic processor configured to train the monitoring device (5) using monitoring images (6a, b) obtained from the monitoring device (5).

10. The monitoring system (1) according to claim 9, wherein the monitoring images (6a, b) are formed by the monitoring images (6a, b) in which an included person (4) is recognized based on matching personal data.

11. The monitoring system (1) according to claim 1, wherein the at least one sensor device (7a, b) is a component of a point-of-sale (POS) system.

12. A method for recognizing persons (4) in a plurality of monitoring images (6a, b), wherein persons (4) are detected in the monitoring images (6a, b), wherein person-related object information is captured in a monitoring region (2), at least one person-related object information item from a partial monitoring region (2a, b) of the monitoring region (2) being assigned to a person (4) in the same partial monitoring region (2b) and being provided as personal data, wherein the personal data also includes a feature of the person (4) detected in the monitoring images (6a, b), wherein a plurality of personal data items from a plurality of different partial monitoring regions (2a, b) are compared, and wherein if a match is found in the personal data from at least two partial monitoring regions (2a, b) a person is recognized in the monitoring images (6a, b), wherein matches of the person-related object information are prioritized erson (4).

13. The method according to claim 12, wherein the persons (4) are tracked based on the monitoring images (6a, b) in the partial monitoring regions (2), wherein if a match is found in the personal data from the at least two different partial monitoring regions (2a, b) the tracked person (4) is recognized in the monitoring images (6a, b).

14. The method according to claim 12, wherein the monitoring images (6a, b) with the matching personal data are generated and/or stored as training data for training an image processing algorithm.

15. A non-transitory, computer-readable storage medium containing instructions that when executed by a computer cause the computer to control a monitoring system to:
   detect persons (4) in monitoring images (6a, b),
   capture person-related object information in a monitoring region (2),
   assign at least one person-related object information item from a partial monitoring region (2a, b) of the monitoring region (2) to a person (4) in the same partial monitoring region (2b), the at least one person-related object information provided as personal data, wherein the personal data also includes a feature of the person (4) detected in the monitoring images (6a, b), compare a plurality of personal data items from a plurality of different partial monitoring regions (2a, b), and wherein if a match is found in the personal data from at least two partial monitoring regions (2a, b) a person is recognized in the monitoring images (6a, b), wherein matches of the person-related object information are prioritized over matches of the feature of the person (4).

\* \* \* \* \*